(12) United States Patent  
Sasaki et al.

(10) Patent No.: US 9,442,877 B2  
(45) Date of Patent: Sep. 13, 2016

(54) STORAGE DEVICE

(71) Applicant: Kabushiki Kaisha Toshiba, Minato-ku (JP)

(72) Inventors: Yuki Sasaki, Kanagawa (JP); Takahiro Kurita, Kanagawa (JP); Atsuhiro Kinoshita, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 474 days.

(21) Appl. No.: 14/023,835

(22) Filed: Sep. 11, 2013

(65) Prior Publication Data

US 2014/0195710 A1 Jul. 10, 2014

(30) Foreign Application Priority Data

Jan. 10, 2013 (JP) ................................. 2013-002999

(51) Int. Cl.
*G06F 13/40* (2006.01)
*G06F 15/17* (2006.01)
*G06F 15/173* (2006.01)

(52) U.S. Cl.
CPC .......... *G06F 13/4081* (2013.01); *G06F 15/17* (2013.01); *G06F 15/17381* (2013.01)

(58) Field of Classification Search
CPC .............. G06F 15/17; G06F 13/4081; G06F 15/173813; G06F 15/17381
See application file for complete search history.

(56) References Cited

U.S. PATENT DOCUMENTS 5,274,800 A * 12/1993 Babb ...................... G06F 13/37 714/32
5,550,986 A 8/1996 DuLac
6,424,625 B1 7/2002 Larsson et al.
6,457,100 B1 9/2002 Ignatowski et al.
7,016,213 B2 3/2006 Reeves et al.
7,421,525 B2 9/2008 Polzin et al.
7,457,916 B2 11/2008 Suzuki et al.
8,549,092 B2 10/2013 Resnick
2004/0230718 A1 11/2004 Polzin et al.

(Continued)

FOREIGN PATENT DOCUMENTS

JP 7-234763 9/1995
JP 2006-243967 9/2006

(Continued)

OTHER PUBLICATIONS

Office Action issued Sep. 23, 2015 in Taiwanese Patent Application No. 102129705 (with English language translation).

(Continued)

*Primary Examiner* — Tim T Vo
*Assistant Examiner* — Phong H Dang
(74) *Attorney, Agent, or Firm* — Oblon, McClelland, Maier & Neustadt, L.L.P.

(57) ABSTRACT

According to one embodiment, a storage device includes a processing unit and a plurality of storage units. The processing unit includes a processor and a network communication unit. The storage unit includes a processor input/output port connected to the processing unit via a bus, a storage-unit input/output port connected to adjacent storage unit thereto, a memory capable of storing data, and a routing unit configured to perform a transfer process by determining a transfer route of the data to another one of the storage units on the basis of positional information of the storage unit included in the data.

5 Claims, 22 Drawing Sheets

(56) References Cited

U.S. PATENT DOCUMENTS

| | | |
|---|---|---|
| 2005/0071542 A1 | 3/2005 | Weber et al. |
| 2005/0162882 A1 | 7/2005 | Reeves et al. |
| 2005/0166006 A1 | 7/2005 | Talbot et al. |
| 2006/0200696 A1 | 9/2006 | Shimada |
| 2006/0218451 A1* | 9/2006 | Abe ................ G06F 11/1666 714/52 |
| 2009/0024822 A1 | 1/2009 | Lin |
| 2009/0106471 A1* | 4/2009 | Kaushik ............ G06F 13/4081 710/302 |
| 2009/0216924 A1 | 8/2009 | Bennett |
| 2010/0211721 A1* | 8/2010 | Resnick ................ G06F 12/00 711/103 |
| 2010/0241783 A1 | 9/2010 | Garcia et al. |
| 2011/0067039 A1* | 3/2011 | Eilert ............... G06F 15/17318 719/328 |
| 2011/0264890 A1 | 10/2011 | Lafi et al. |
| 2012/0117354 A1 | 5/2012 | Tatsumura et al. |

FOREIGN PATENT DOCUMENTS

| | | |
|---|---|---|
| JP | 2010-171557 A | 8/2010 |
| JP | 2011-60279 A | 3/2011 |
| JP | 2011-182393 | 9/2011 |
| JP | 2012-80390 | 4/2012 |
| JP | 2012-103926 | 5/2012 |
| JP | 2012-518843 A | 8/2012 |
| TW | 200824197 A | 6/2008 |
| TW | I351613 B | 11/2011 |

OTHER PUBLICATIONS

Office Action issued Jan. 26, 2016 in Japanese Patent Application No. 2013-002999 (with English language translation).

Office Action issued May 5, 2016 in Chinese Patent Application No. 2013103946792 (with English language translation).

* cited by examiner

FRONT    BACK

FRONT    BACK

STORAGE DEVICE

CROSS REFERENCE TO RELATED APPLICATIONS

This application is based upon and claims the benefit of priority from Japanese Patent Application No. 2013-002999, filed on Jan. 10, 2013; the entire contents of which are incorporated herein by reference.

FIELD

Embodiments described herein relate generally to a storage device.

BACKGROUND

In recent years, as cloud computing and the like have become popular along with the progress in manufacturing technique for semiconductor devices, it happens more often that a plurality of information processing devices each including a storage device is mutually connected via a network so as to work as one information processing system. Moreover, a storage device which is higher in speed than a conventional storage device utilizing HDD is known. The higher-speed storage device is formed by connecting a number of DRAM chips or NAND flash chips with inter-chip wires.

In such a single information system formed by connecting the plural information processing devices, the performance is improved by increasing the number of information processing devices constituting the system. In a large-scaled information processing system with a large number of devices, however, problems occur in that the performance as expected cannot be achieved and the management of the system requires a large amount of time, effort and cost.

As a solution to the problems, a storage device formed by connecting a plurality of memory nodes with a data transfer function has been suggested so far. In such a storage device, each memory node performs a predetermined process such as readout or writing upon the reception of a data packet addressed thereto, and if the memory node receives a packet not addressed thereto, the memory node transfers the received packet to another appropriate memory node. By repeating the appropriate transfer among the memory nodes, the data packet can reach the target memory node. Such a structure provides an advantage of facilitating the design even though the storage device is large-scaled.

Even such a technique is employed, however, other problems occur in that, if a large-scaled system including a plurality of boards, cases, or racks is configured, the desired high performance cannot be obtained or the operation of the system is difficult at the scale out.

DETAILED DESCRIPTION

In general, according to one embodiment, a storage device includes a processing unit and a plurality of storage units. The processing unit is configured to issue a control instruction for reading out or writing data. The storage units are connected to each other in two- or more-dimensional arrangement. The processing unit includes a processor, and a network communication unit configured to communicate with an external network connected to the processor via a bus. The storage unit includes a processor input/output port connected to the processing unit via the bus, a storage-unit input/output port connected to an adjacent storage unit thereto, a memory capable of storing data, and a routing unit configured to perform a transfer process by determining a transfer route of the data to another one of the storage units on the basis of positional information of the storage unit included in the data.

Exemplary embodiments of a storage device will be explained below in detail with reference to the accompanying drawings. The present invention is not limited to the following embodiments.

Figure 1:
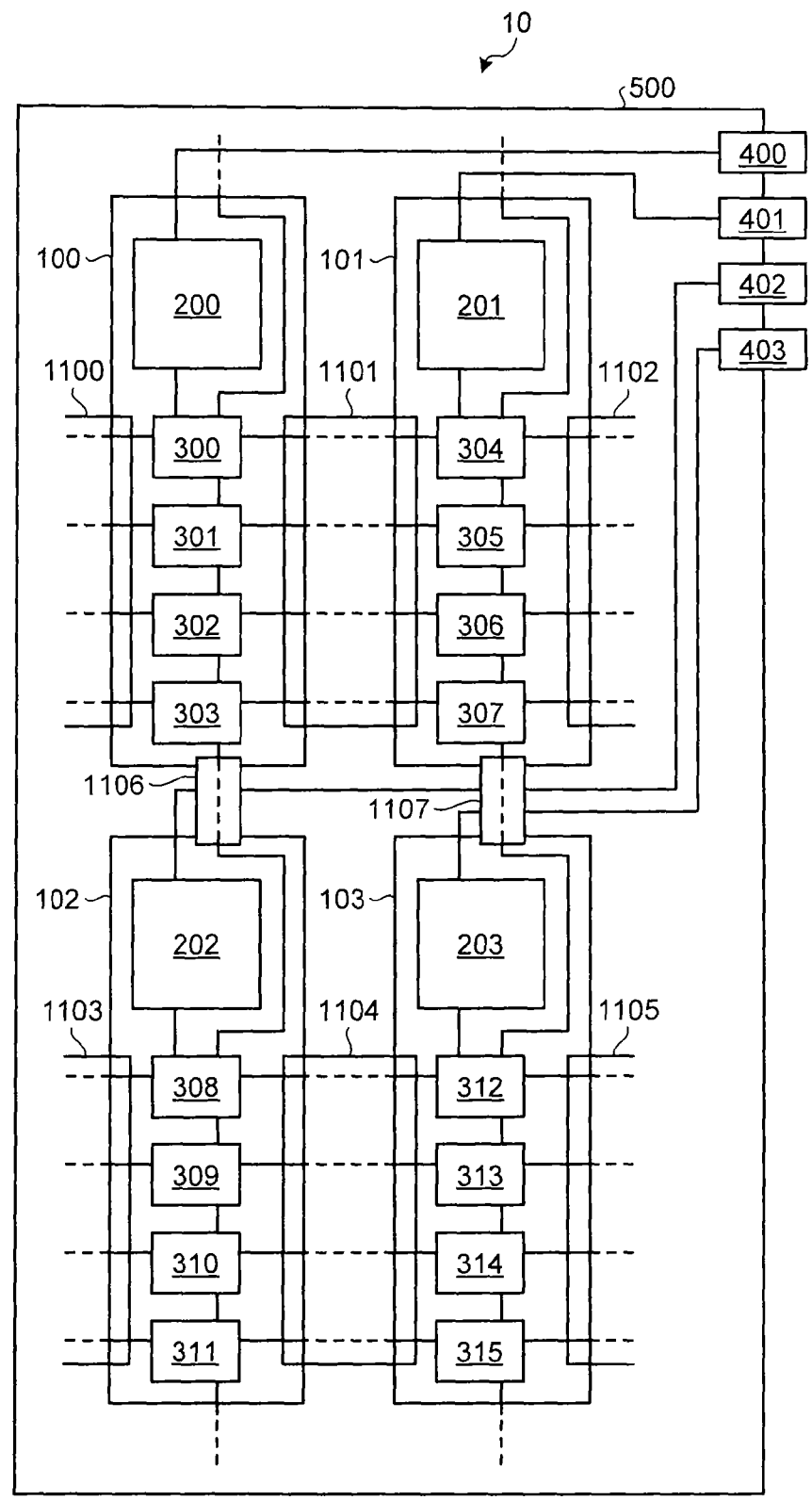
FIG. 1 is a diagram illustrating a structure of a storage device according to an embodiment.

A storage device according to an embodiment of the present invention is hereinafter described. FIG. 1 depicts a structure of a storage device 10. The storage device 10 includes processing units 200 to 203, and memory nodes 300 to 315. The processing units 200 to 203 perform the data processing in the storage device 10, and correspond to processing units for controlling reading and writing of data relative to the memory nodes 300 to 315. The memory nodes 300 to 315 are nonvolatile memories that hold data even under no power supply, and has a function of transferring the data to other memory nodes and can read out and write the data relative to the other memory nodes. The processing units 200 to 203 and the memory nodes 300 to 315 are provided as electronic components such as IC packages in this embodiment, and can exchange electric signals via wires.

The processing units 200 to 203 (processing units) and the memory nodes 300 to 315 (storage units) are mounted on printed boards 100 to 103, and data can be exchanged via wires on the printed boards 100 to 103 or via connectors 1100 to 1107 and the like connecting between the printed boards 100 to 103. The memory nodes 300 to 315 are arranged in a two-dimensional lattice form. At least a part of the lattice-form connection wires, for example, the wires between the printed boards 100 to 103 are mutually connected via the connectors 1100 to 1107 which allow physical insertion and extraction of the wires.

The processing unit 200 is connected to the memory node 300, and accesses any other memory nodes 301 to 315 via the memory node 300 using coordinates on the two-dimensional lattice. This similarly applies to the other processing units 201 to 203. The processing units 200 to 203 can exchange data with a host system via host interfaces 400 to 403. Each of these members is housed in a case 500.

In this embodiment, for the convenience of description, only one processing unit is mounted on each of the printed boards 100 to 103; however, a plurality of processing units can be mounted. Further, although only one of the host interfaces 401 to 403 is connected to each substrate, plural host interfaces may be connected thereto. Similarly, although four memory nodes are mounted in line, the number of the memory nodes and the arrangement of the memory nodes may be determined arbitrarily. Further, the number of boards as the printed boards housed in the case 500 is not limited to four.

In the network arranged in the two-dimensional lattice form described in the embodiment, for example, the processing unit 200 accesses the memory node 305 through sequential transmission and reception of a data packet in the order of, for example, the memory nodes 300, 301, and 305. In other words, in this example, the packet is transmitted and received three times; as the scale of the whole system is increased, the number of times of the transmissions and receptions increases and a large delay time comes to be generated before the packet reaches the actual target node. Therefore, in a large-scaled system, shortening the time required for the sequential transmission and reception of the packet is the key of the performance of the system.

In a conventional system with an HDD used as a storage medium, since the HDD itself has a large delay time, the delay time cannot be shortened. The delay time at the sequential transmission and reception of the packet becomes drastically long if other wires than those on the printed boards 100 to 103 (such as a cable) are used between the memory nodes 300 to 315 in the two-dimensional lattice or if the transfer route is selected by the processing units 200 to 203, etc. Therefore, by the use of the wires on the printed boards 100 to 103 not via bus connection, the time is drastically shortened. Note that even if the wires on the printed board and the storage device including the nonvolatile memory are used, the time consumed in the communication, etc. between the cases becomes long when the two-dimensional lattice structure is not employed, in which case the transmission time becomes slow.

Figure 2:
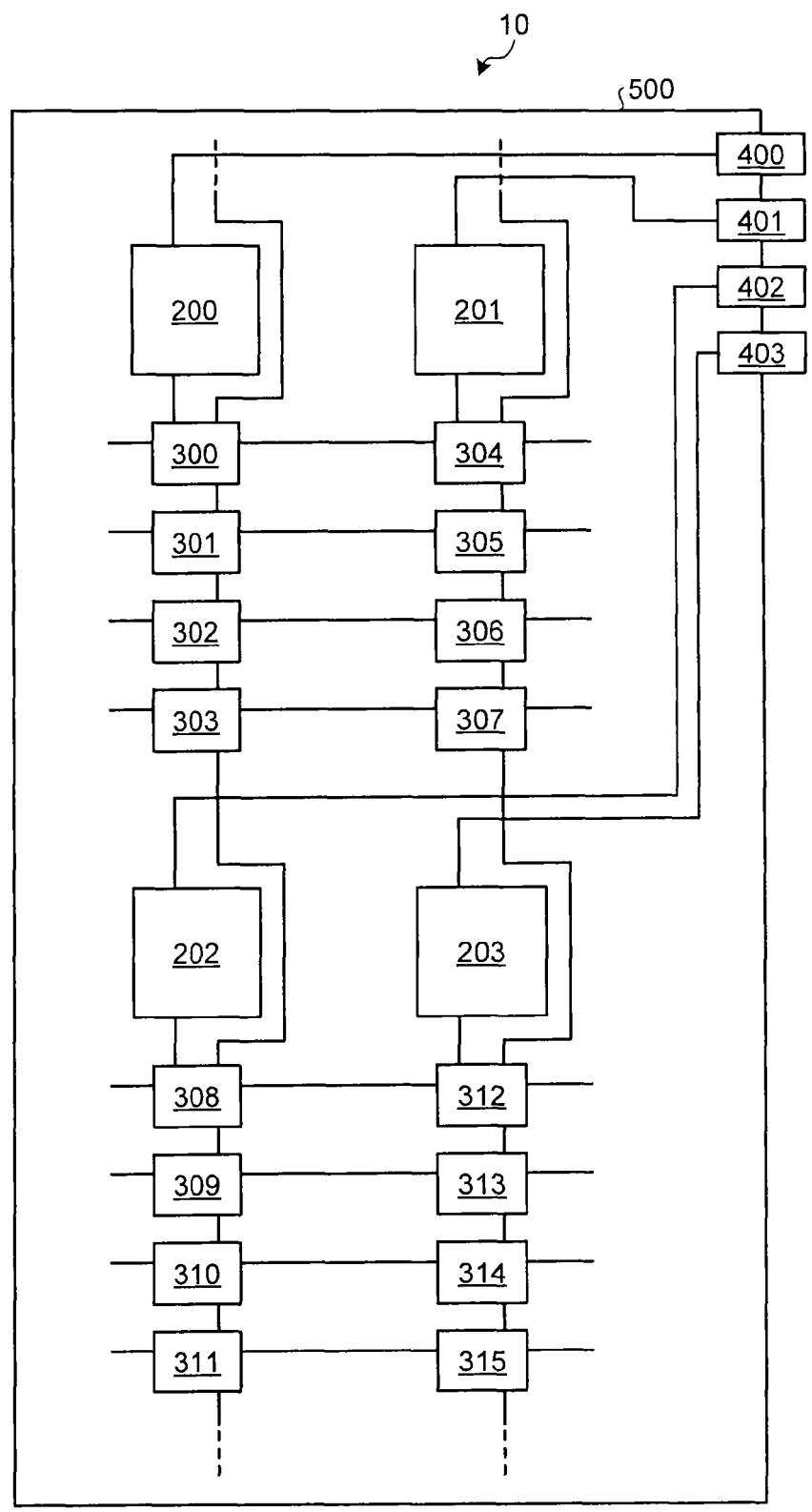
FIG. 2 is a diagram illustrating a structure of a conventional storage device.

In other words, in the case of the storage device including the memory nodes arranged in the two-dimensional lattice form as depicted in FIG. 2, the transmission time becomes slow if the memory nodes 300 to 315 include the HDD or the connection between the memory nodes is not achieved by the wires on the printed board via the connectors 1100 to 1105 which allow physical insertion and extraction of the wires.

Figure 3:
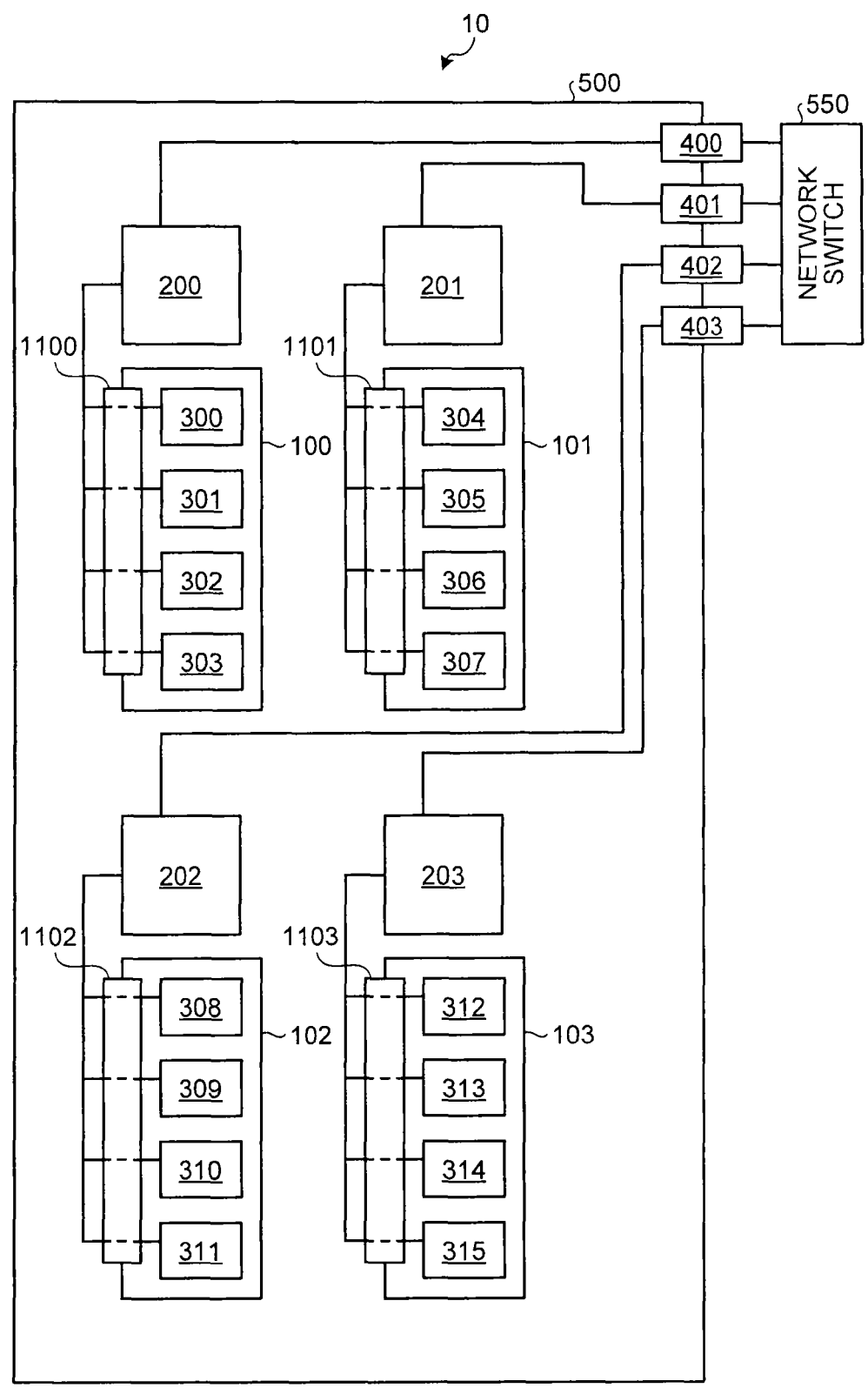
FIG. 3 is a diagram illustrating a structure of a conventional storage device.

Further, even though the memory nodes 300 to 315 including the nonvolatile memory and the processing units 200 to 203, and the like are connected by the wires on the printed board via the connectors 1100 to 1105 which allow physical insertion and extraction of the wires as depicted in FIG. 3, desired transmission speed cannot be achieved unless the memory nodes 300 to 315 are connected in the two-dimensional lattice form. This is because, if the exchange of data among the memory nodes 300 to 315 is desired, it is necessary for the data to go through an external network switch 550 as depicted in the drawing.

Next, another effect of this embodiment is described. In a case of a single system including a number of memory nodes, even though some memory nodes are in trouble in the system, the entire system needs to keep functioning normally. Constructing a system satisfying such a requirement is possible with a known technique such as RAID (Redundant Arrays of Inexpensive Disks); however, in order to facilitate the scale out, it is necessary that the memory node with the trouble, which inevitably occurs in the operation, can be easily replaced.

In this embodiment, the printed boards 100 to 103 each provided with at least one node are connected to each other via the connectors 1100 to 1105 which allow physical insertion and extraction of the wires as depicted in FIG. 1; therefore, the memory node with the trouble can be easily replaced by simply removing any of the printed boards 100 to 103 including the memory node with the trouble and inserting the new printed boards 100 to 103. On this occasion, although the processing units 200 to 203 do not know that the printed boards 100 to 103 are being replaced, the data transfer is still possible via other printed boards than the printed board being replaced because a plurality of data paths exists. For example, if the processing unit 200 reads out or writes data relative to the memory node 313, there is a path via the printed board 102 and a path via the printed board 101. Therefore, for example, if the printed board 101 is being replaced, the path via the printed board 102 can be selected due to the data transfer among the memory nodes even though the processing units do not know about the replacement as long as an appropriate routing algorithm is provided.

Meanwhile, in the case of the structure depicted in FIG. 2, it is necessary to replace the node by removing the connection wires connected to the memory node with the trouble, in which case the procedure is extremely complicated. During such complicated work, a communication path often suffers from noise. From this viewpoint, the structure as depicted in FIG. 1 is desirable.

Even when the memory nodes 300 to 315 are mounted on the printed boards 100 to 103, the communication among arbitrary nodes needs to be made via the network switch 550 as depicted in FIG. 3 if the network is not two-dimensional network. Therefore, during the replacement of the printed board 100, for example, the data having been exchanged with the printed board 100 via the host interface 400 needs to pass through the other interfaces 401 to 403, in which case the loads on the interfaces are increased. Thus, the load needs to be adjusted before the replacement.

In this embodiment, the data are exchanged between the memory nodes 300 to 303 on the printed board 100 and the other memory nodes 304 to 315 due to the data transfer among the memory nodes without the necessity of the interposition of the host interface 400; therefore, the load adjustment as above is not necessary. For example, even though the printed board 101 is removed while the data are exchanged between the processing unit 200 and the memory node 313 via the printed board 101, there is still another path via the printed board 102. Therefore, the load adjustment for the host interfaces 401 to 403 is not necessary. Note that in the case of the two-dimensional lattice form, there are an infinite number of data transfer paths for the connection among the memory nodes; therefore, the load adjustment is not necessary as long as the network has the appropriate routing algorithm.

Figure 4:
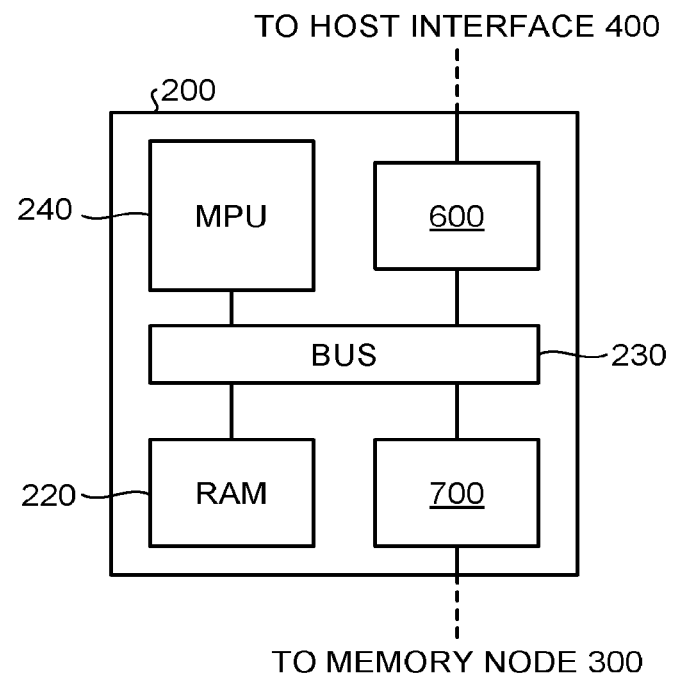
FIG. 4 is a diagram illustrating an internal structure of a processing unit according to the embodiment.

Next, an internal structure of the processing units 200 to 203 and the memory nodes 300 to 315 is described. FIG. 4 depicts an internal structure of the processing unit 200. The processing unit 200 includes a microprocessor (MPU) 240 corresponding to a processor for processing data, a random access memory (RAM) 220 as a main memory, a first interface device 600, and a second interface device 700. The first interface device 600 is to exchange data with the host interface 400, and corresponds to a network communication unit performing communication with an external network. The second interface device 700 is to exchange data with the memory node 300 including a nonvolatile memory. These units are connected to each other with a BUS 230 that allows the data exchange.

As the MPU 240, for example, A9 (800 MHz) manufactured by ARM Ltd., Core i7 manufactured by Intel Corporation, or the like can be used. In this case, to suit the MPU 240, AMBA BUS or QPI (Quick Path Interconnect) BUS or the like is used as the BUS 230. As the RAM 220, for example, a volatile memory such as DRAM of 4 GB, magnetoresistive random access memory (MRAM), phase-change memory (PcRAM), resistive random access memory (RRAM, (registered trademark)), or the like can be used. As the first interface device 600 corresponding to the network communication unit performing communication with the external network, for example, Ethernet (registered trademark), a network interface such as InfiniBand or Fibre channel, an external BUS such as PCI Express, Universal serial bus, or Serial attached SCSI, a storage interface, or the like can be used. At the second interface device 700, the MPU 240 performs the communication with the memory node 300 via the BUS 230.

Figure 5:
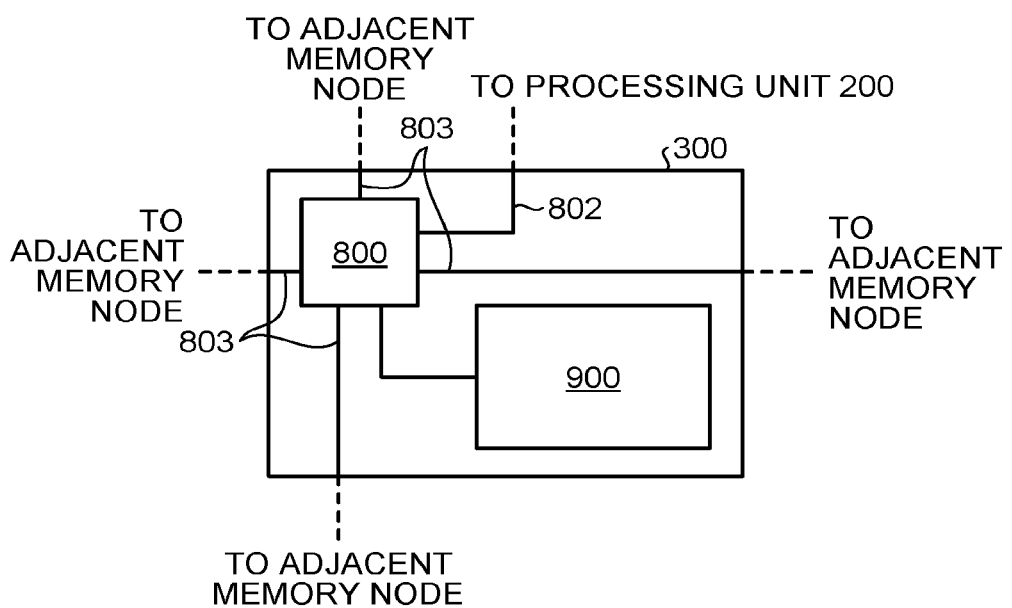
FIG. 5 is a diagram illustrating an internal structure of a memory node according to the embodiment.

FIG. 5 depicts an internal structure of the memory node 300. The memory node 300 includes a controller 800, and a first nonvolatile memory 900 forming a storage. The controller 800 includes at least six kinds of data communication interfaces, and four of them correspond to storage-unit input/output ports 803 used for the data communication with the adjacent memory nodes. Another one of them corresponds to a processor input/output port 802 used for the data communication with the processing unit 200. The other one corresponds to the interface relative to a first nonvolatile memory 900.

As a specific example of the first nonvolatile memory 900, NAND flash memory, bit cost scalable memory (BiCS), MRAM, PcRAM), RRAM, (registered trademark), or the like is given.

Figure 6:
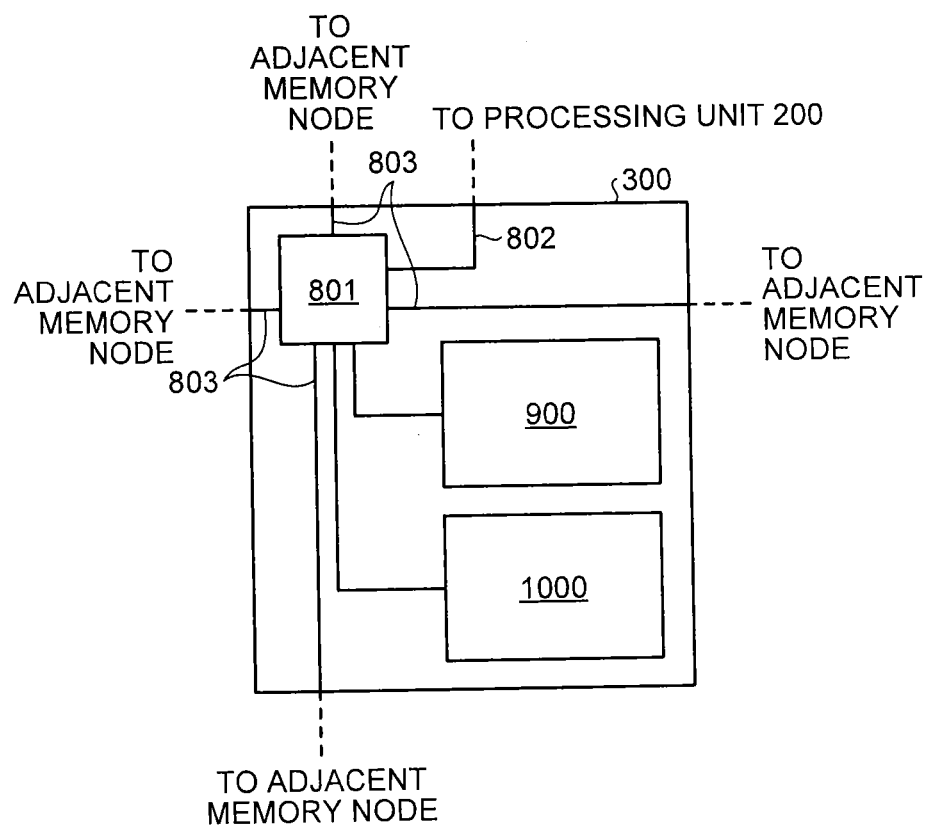
FIG. 6 is a diagram illustrating an internal structure of another memory node according to the embodiment.

FIG. 6 depicts another structure of the memory node 300. In this example, a controller 801 includes seven kinds of data communication interfaces, one of which is a new interface relative to a second nonvolatile memory 1000. As the second nonvolatile memory 1000, a memory with excellent speed, random access performance, and number of times of rewriting as compared with the first nonvolatile memory 900 is used; specifically, DRAM, MRAM, PcRAM, RRAM (registered trademark) is used.

The second nonvolatile memory 1000 stores, for example, data whose number of times of reading and writing is large, which are called meta information. Examples of the meta information include, if a specific address in the first nonvolatile memory 900 and the second nonvolatile memory 1000 is different from the logic address on a system, table information for mutual conversion, the attribute information of data recorded in the first nonvolatile memory 900 and the second nonvolatile memory 1000, etc.

Figure 7:
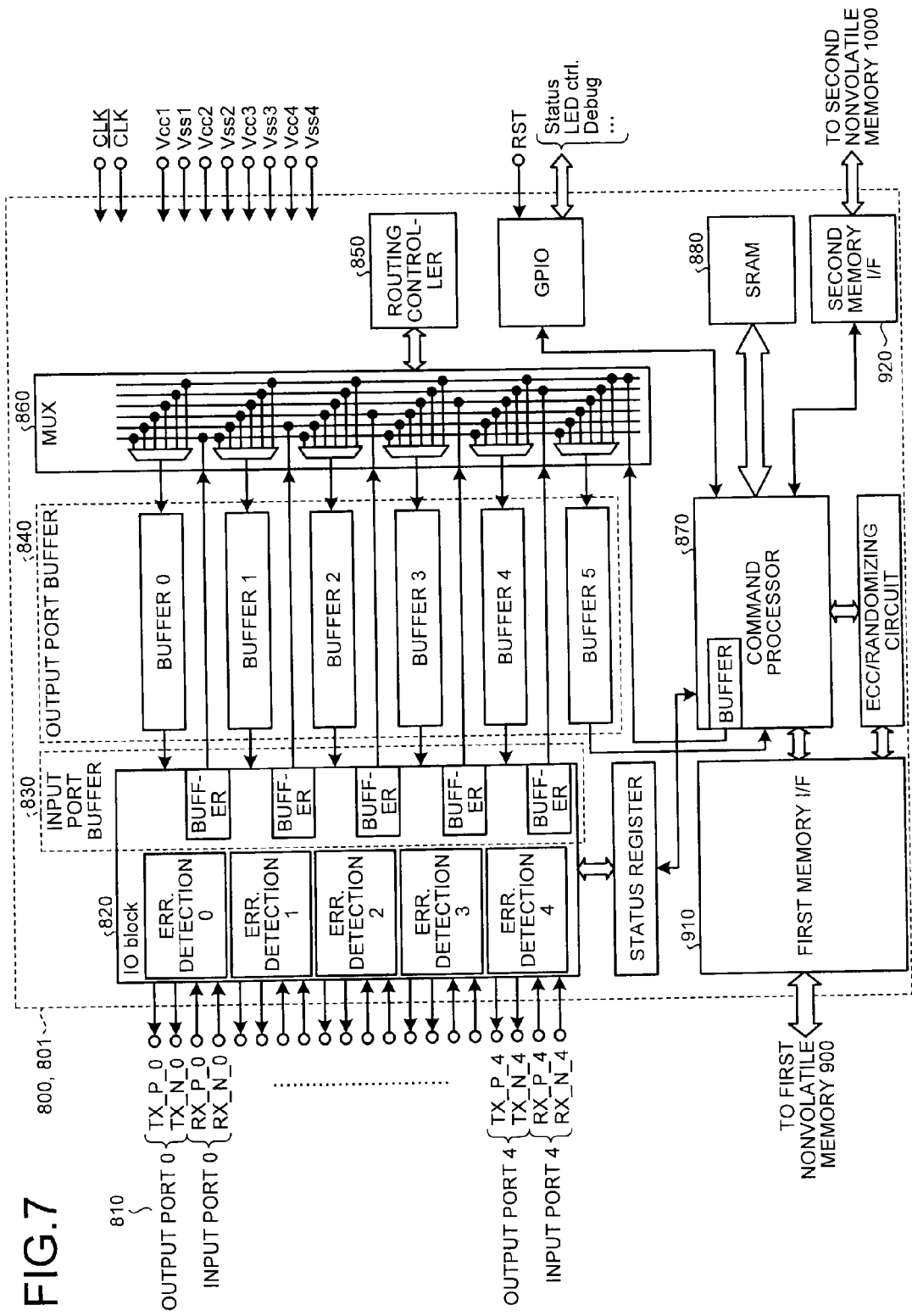
FIG. 7 is a diagram illustrating a detailed structure of a controller of a memory node according to the embodiment.

Next, the specific structures of the controllers 800 and 801 are described with reference to FIG. 7. As depicted in FIG. 7, the controllers 800 and 801 include five input/output ports 810 including No. 0 to No. 4 ports, an IO block 820, an input port buffer 830, and an output port buffer 840. The No. 0 input/output port 810 is used for the data communication with the processing unit 200, and corresponds to the processor input/output port 802. The other No. 1 to No. 4 ports correspond to the storage-unit input/output ports 803 used for the data communication with the corresponding memory nodes. Note that the data are transferred among the memory nodes 300 to 315 as data packets with a predetermined size unit. The packet includes a header part including at least the positional information of the memory node including a transmission destination address and a transmission source address, and a data part.

Upon the input of the data from the input/output port 810, a routing controller 850 (routing part) determines the routing destination of the packet on the basis of at least two pieces of information of the transmission destination (destination) address included in the packet and the address of the memory node itself. The routing controller 850 switches a multiplexer (MUX) 860 to transfer the input data to the appropriate output port buffer 840.

On this occasion, in the case of the data addressed to the memory node itself, the data are sent to a command processor 870. The command processor 870 performs the appropriate process such as data reading and writing relative to an SRAM 880, to the first nonvolatile memory 900 via a first memory I/F 910, and to the second nonvolatile memory 1000 via a second memory I/F 920, for example. In the case of the readout instruction, for example, the command processor 870 generates a new data packet and transmits the packet to the output port buffer 840.

Inside the IO block 820, an error detection circuit for each input/output port 810 is provided. The error detection circuit transmits error information in the occurrence of abnormality during the exchange of data or abnormality in the controllers 800 and 801 and the connected nonvolatile memories 900 and 1000, etc. Thus, before the transfer of the data, the abnormality of the adjacent memory node is detected and the data exchange with that memory node with the abnormality is avoided.

In such a case, the error information may employ any method; it is desirable that the state receiving no signal is recognized as an error in consideration that the memory node itself is in trouble. In the controller 800, the second memory I/F 920 may be omitted.

Figure 8A:
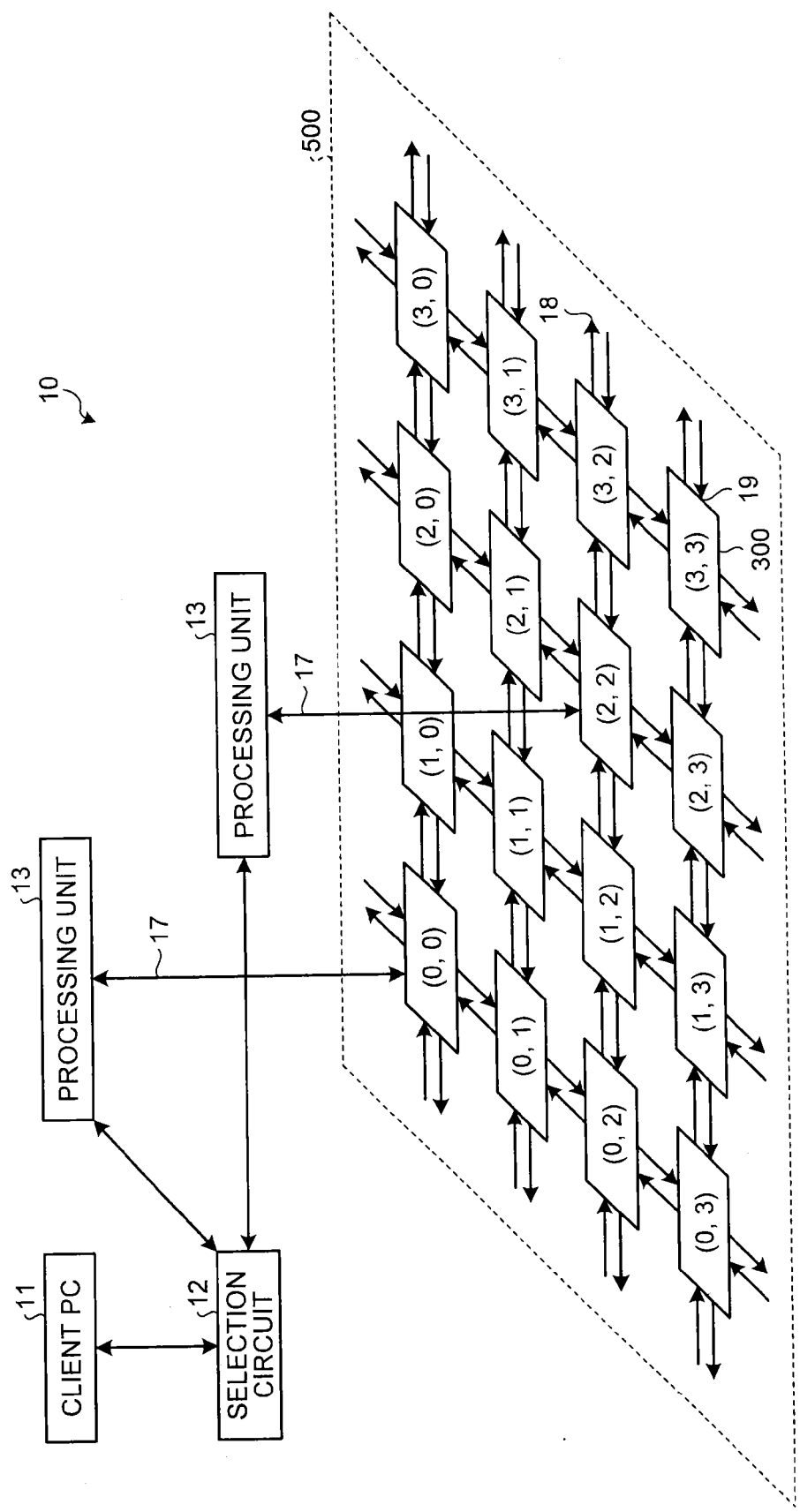
FIG. 8A is a diagram for describing a routing algorithm for transferring data according to the embodiment.
Figure 8B:
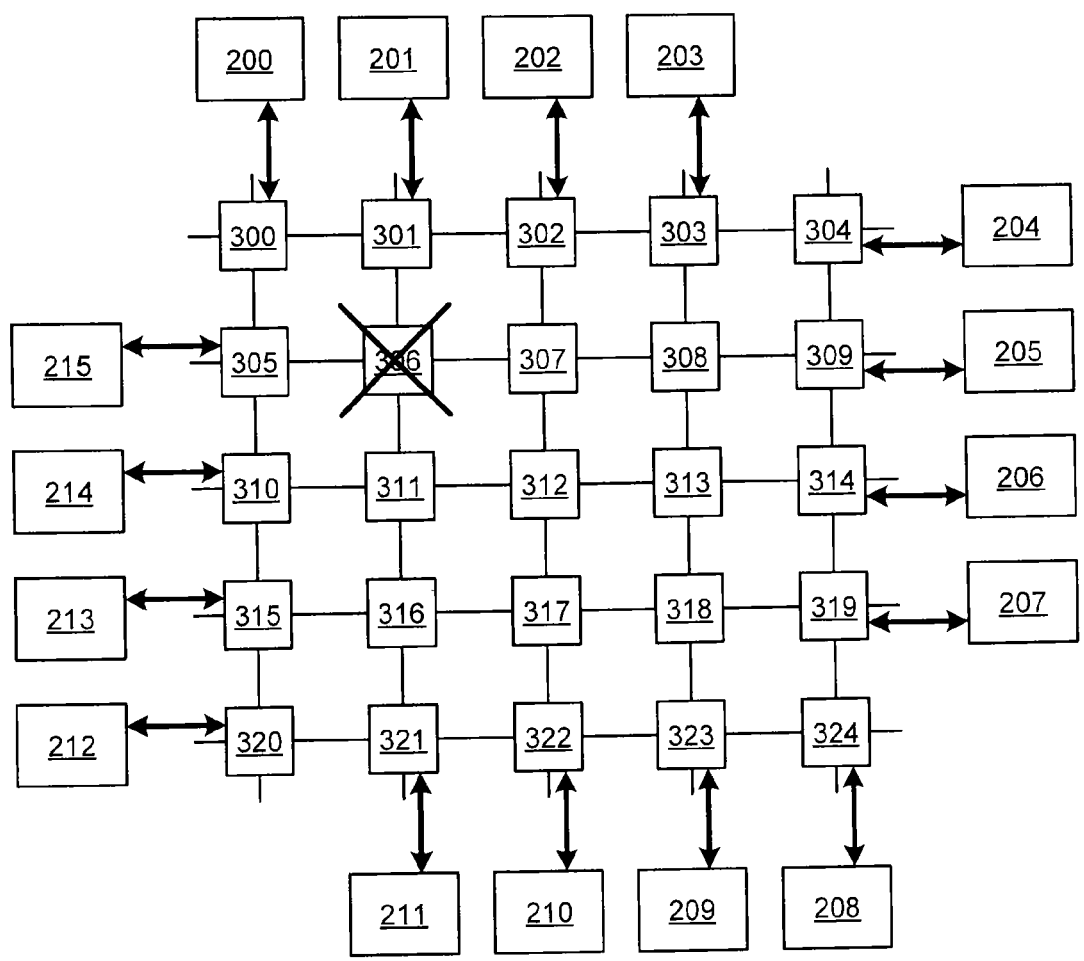
FIG. 8B is a diagram for describing a routing algorithm for transferring data in the occurrence of abnormality in the embodiment.

Next, the routing algorithm at the time of data transfer is described with reference to FIGS. 8A and 8B. As depicted in FIG. 8A, the data are diffused and stored in the memory nodes 300 in the storage device 10. In this example, the memory nodes 300 are disposed in the two-dimensional lattice form. The coordinate of the lattice point is represented by (x, y) and the physical address of the memory node 300 disposed on the lattice point is represented by the physical address $(x_D, y_D)$ in accordance with the coordinate of the lattice point.

In the example of FIG. 8A, the memory node 300 at the upper left corner has the physical address of origin (0, 0), and the integer value of the physical address of the memory node increases or decreases by the movement of each memory node 300 in a horizontal direction (X direction) and a vertical direction (Y direction).

Each memory node 300 includes four input ports 18 and four output ports 19. Each memory node 300 is connected to the adjacent memory node 300 via these four input ports 18 and four output ports 19. Specifically, the adjacent memory nodes 300 facing each other are connected to each other via their common input ports 18 and output ports 19.

For example, in FIG. 8A, the memory node 300 at the upper left corner represented by the physical address (0, 0) is connected to the memory node 300 adjacent thereto in the X direction, which is represented by the physical address (1, 0) and to the memory node 300 adjacent thereto in the Y direction different from the X direction, which is represented by the physical address (0, 1). The memory node 300 represented by the physical address (1, 1) is connected to the four memory nodes 300 adjacent thereto in four different directions, which are represented by the physical addresses (1, 0), (0, 1), (2, 1), and (1, 2).

The storage device 10 includes at least one processing unit 13 for performing calculation of parity and issue of a data reading and writing instruction. The processing unit 13 is connected to the memory node 300 via a BUS 17. In FIG. 8A, the processing unit 13 is connected to the memory nodes 300 represented by the physical addresses (0, 0) and (2, 2).

The data to be stored in each memory node 300 are supplied to the storage device 10 via the network from an external client PC 11, and input to a selection circuit 12. The selection circuit 12 examines the state of each processing unit 13, and selects the processing unit with processing margin and transfers the data to the selected processing unit 13.

Next, the flow of routing in the occurrence of abnormality is described with reference to FIG. 8B. When the processing unit 200 performs data readout and writing relative to the memory node 312, the data follows a route along a straight line with the minimum distance from the memory node 300 connected to the processing unit 200 as a start point to the memory node 312 as the target destination, such as a route of 300→301→306→311→312. Here, for example, a case is assumed in which the memory node 306 suffers from a trouble or is crowded so that the data cannot be transmitted from the memory node 301. In this case, it is desirable that the route with the minimum distance 307→312 is employed as a matter of course by causing the memory node 301 to transmit packet to the memory node 302 along the route with low priority. Thus, in order for the memory node 301 to know that the data cannot be transmitted from the memory node 301 to the memory node 306, the error detection circuit provided for the IO block 820 is used.

Figure 9A:
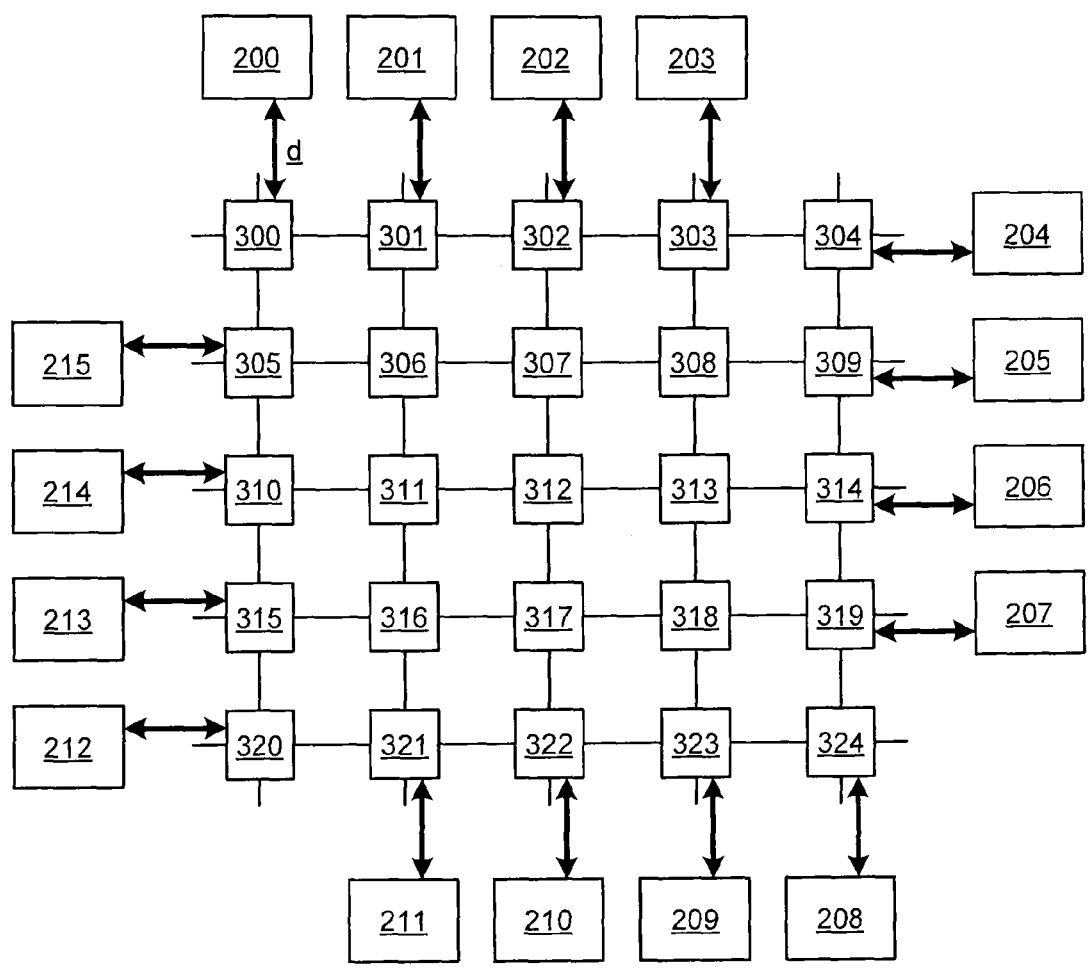
FIG. 9A is a diagram illustrating a connection state between a processing unit and a memory node according to the embodiment.

Next, the preferable connection state between the processing unit 200 and the memory node 300 is described with reference to FIGS. 9A and 9B and FIGS. 10A and 10B. In FIG. 9A, an explanatory view including 5×5 memory nodes is used; this similarly applies to other structures.

As depicted in FIG. 9A, the processing units 200 to 215 are connected to the periphery of the entire network constituted by the memory nodes 300 to 324; thus, the delay time when the data are exchanged among the adjacent processing units 200 to 215 can be shortened as compared with other structures. The periphery refers to the part of the memory nodes 300 which is on the outer side among the memory nodes 300 connected in the two-dimensional lattice form. This is effective in the structure in which the work needs to be shared among the processing units 200 to 215.

Figure 9B:
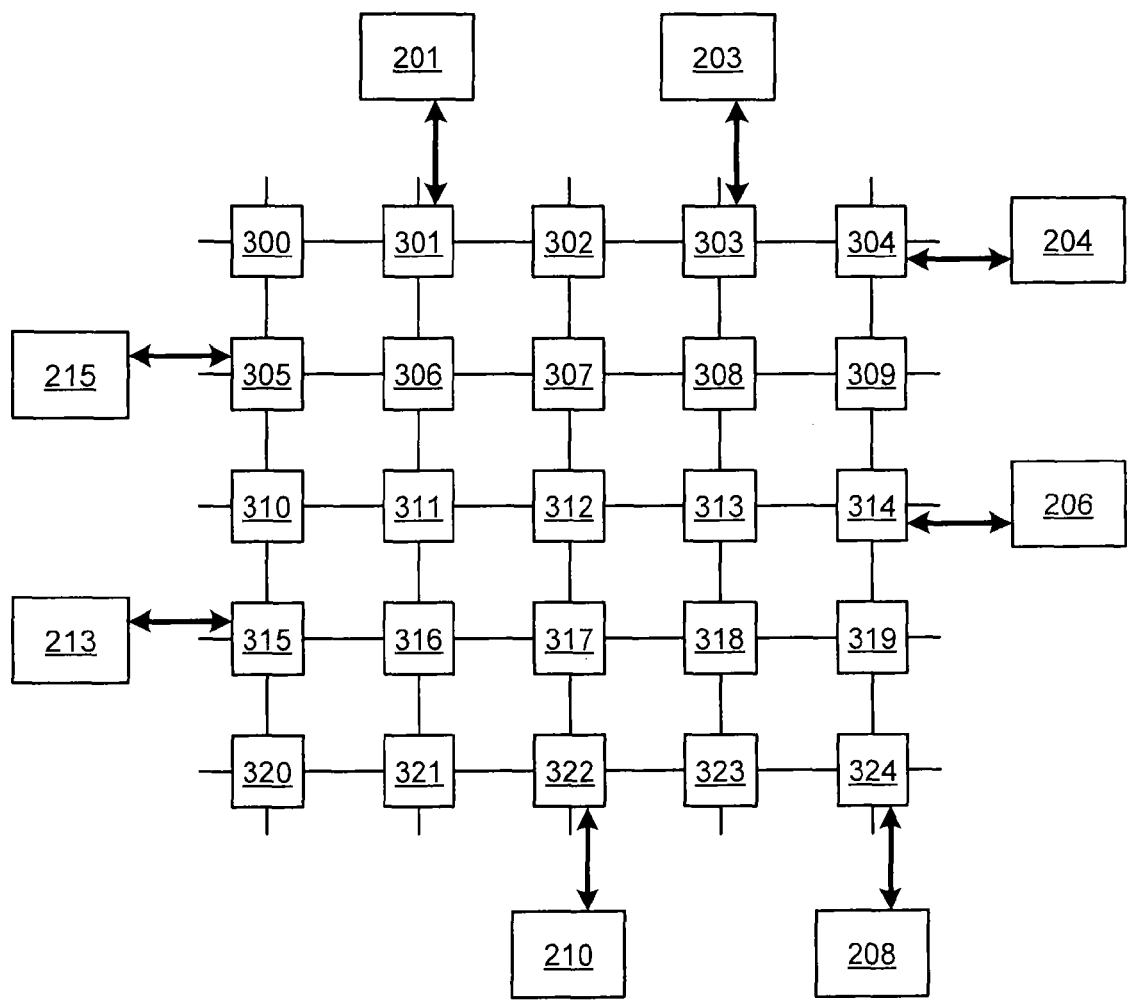
FIG. 9B is a diagram illustrating a connection state between a processing unit and a memory node according to the embodiment.

It is not always necessary to connect the processing units to the entire periphery but the connection may be made at intervals as depicted in FIG. 9B.

Figure 10A:
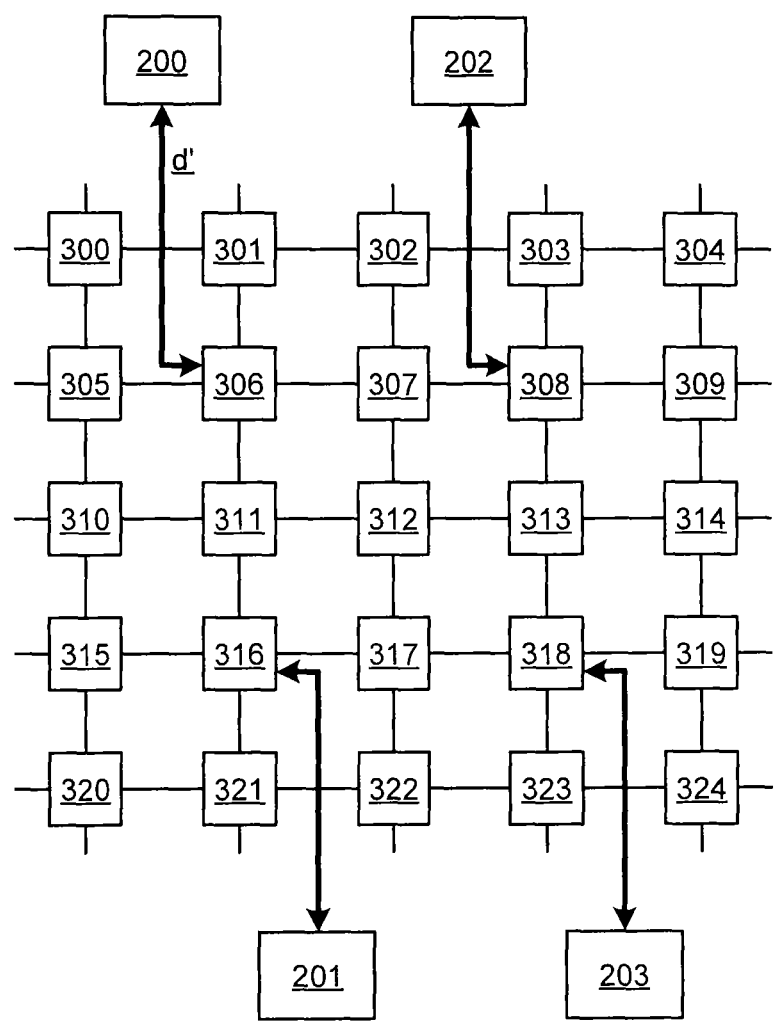
FIG. 10A is a diagram illustrating a connection state between a processing unit and a memory node according to the embodiment.

Further, such a structure is also applicable as that the processing units 200 to 203 are connected to the memory nodes 306, 308, 316, and 318 positioned on the inside in the network including the memory nodes 300 to 324 as depicted in FIG. 10A. In this case, when the processing units are connected to a central part of the memory nodes, the number of average reach steps to any memory node becomes fewer and the overall delay time can be shortened as compared with the case of connecting the processing units to the periphery as depicted in FIG. 9A and FIG. 9B. The central part refers to the memory nodes other than the memory nodes positioned at the periphery. The most preferable embodiment of the central part refers to the memory node positioned at the center of all the memory nodes 300. This is effective in the structure in which the data are written and read independently among the processing units 200 to 203.

Figure 10B:
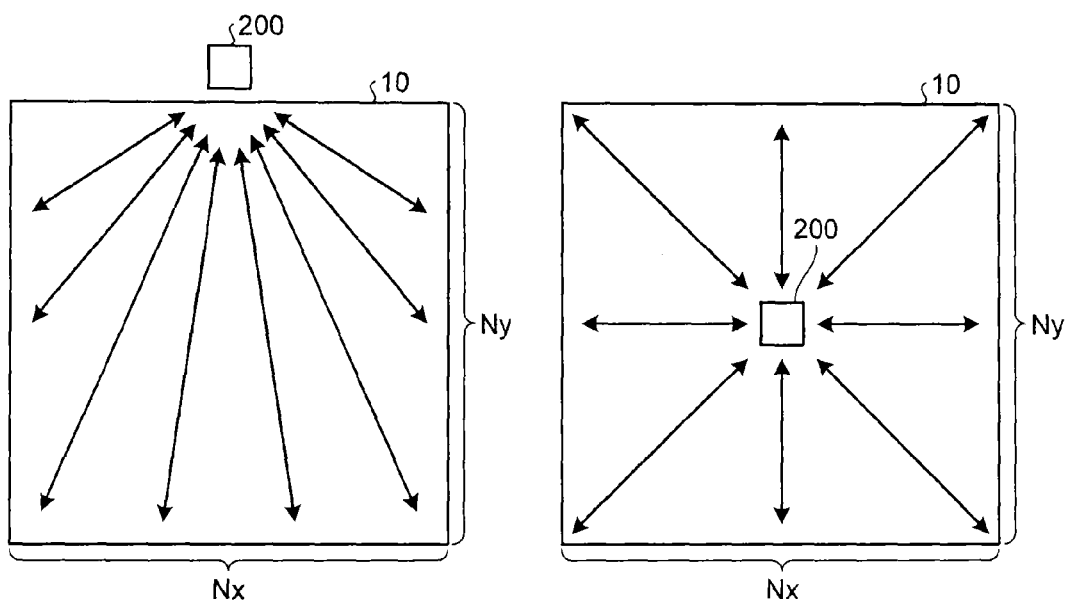
FIG. 10B is a diagram illustrating a connection state between a processing unit and a memory node according to the embodiment.

As depicted in FIG. 10B, the number of memory nodes in x direction is Nx and the number of memory nodes in y direction is Ny in the storage device 10. If the connection destination of the processing unit 200 is limited to the memory node positioned at the periphery of the storage device 10, the average number of times of the transfer of the packet from the processing unit 200 to the target memory node is Nx/2+Ny/2. On the other hand, if the processing unit is connected to the memory node positioned at the center of the storage device 10, the average number of times of the transfer is Nx/4+Ny/4. Therefore, when the processing unit 200 is connected to the memory node inside the storage device 10, the number of average reach steps to any memory node becomes fewer.

Note that if the wire length in the case where the processing unit 200 is connected to the memory node at the periphery is d and the wire length in the case where the processing unit 200 is connected to the memory node on the inside is d' (d<d'), then the increase in signal delay time is Δt. The number of average reach steps that is reduced by the connection of the processing unit 200 on the inside is Δn and the data transfer speed between the memory nodes is T. Here, it is preferably that if Δt<TΔn, the processing unit 200 is connected to the memory node at the periphery and if Δt≥TΔn, the processing unit 200 is connected to the memory node at the center.

Subsequently, the specific example of mounting the processing unit 200 on the board is described with reference to FIG. 11 and FIG. 12. In FIG. 1, the processing unit 200 is mounted on the same printed board 100 as the memory nodes 300 to 303; however, a board provided with at least one or more processing units 200 may be used separately.

Figure 11:
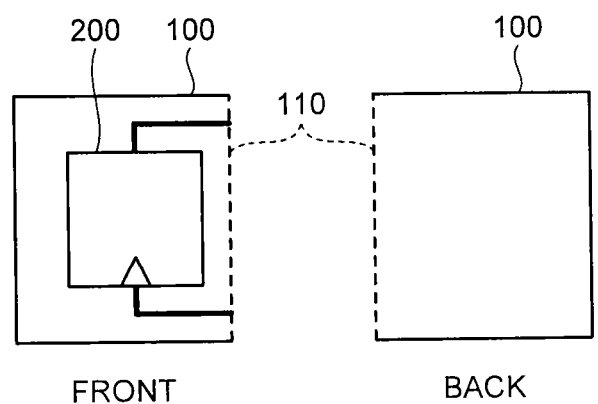
FIG. 11 is a diagram illustrating a mount state in which a processing unit is mounted on a substrate according to the embodiment.
Figure 12:
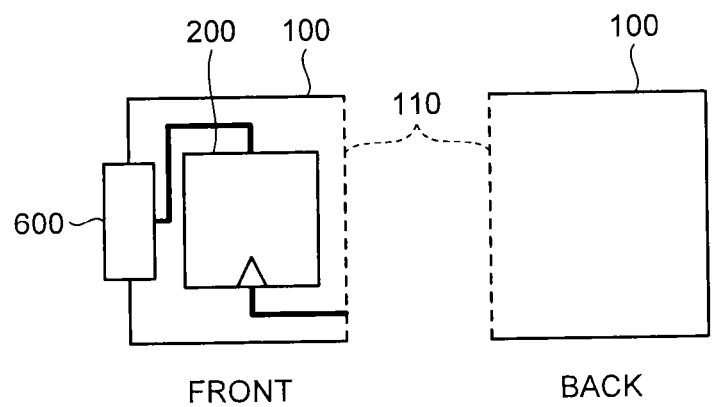
FIG. 12 is a diagram illustrating a mount state in which a processing unit is mounted on a substrate according to the embodiment.

In the example of FIG. 11, the processing unit 200 is mounted on a surface of the printed board 100 and an end of the board 100 is provided with a board slot connection unit 110. In this case, the first interface device 600 and the second interface device 700 for performing the input/output with the aforementioned host interface 400 are connected to wires at the board slot connection unit 110. Alternatively, as depicted in FIG. 12, the first interface device 600 may be formed directly on the surface of the printed board 100 as an interface port.

Figure 13:
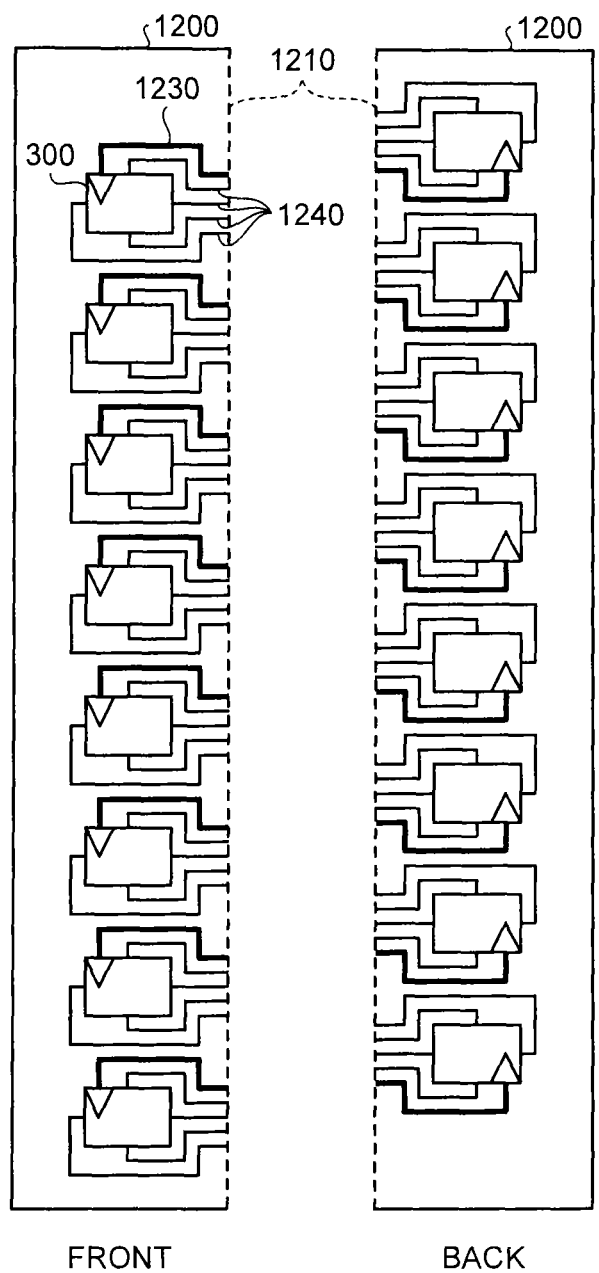
FIG. 13 is a diagram illustrating a mount state in which a memory node is mounted on a substrate according to the embodiment.

FIG. 13 depicts a specific example of mounting the memory node 300 on the board in the storage device 10. In this case, unlike the example of FIG. 1 in which the processing unit is mounted on each printed board, only the memory node is mounted. As depicted in FIG. 13, a memory node board 1200 has the plurality of memory nodes 300 mounted, and a wire 1230 between a board slot connection unit 1210 and one processing unit 200 and four wires 1240 to the adjacent memory node 300 are connected to the board slot connection unit 1210. Although the eight memory nodes 300 are disposed in line on each surface in FIG. 13, the present invention is not limited thereto.

The memory nodes 300 mounted on the memory node board 1200 are connected to each other with the connectors 1100 to 1105 (see FIG. 1) on the slot side of the case 500 to which the board is inserted. In other words, the connection among the memory nodes 300 can be flexibly changed by the connection on the case 500 side.

Further, the memory node board 1200 can be connected to another memory node board 1200 via the slot of the board of the case 500, by which the storage scale can be easily expanded.

Figure 14:
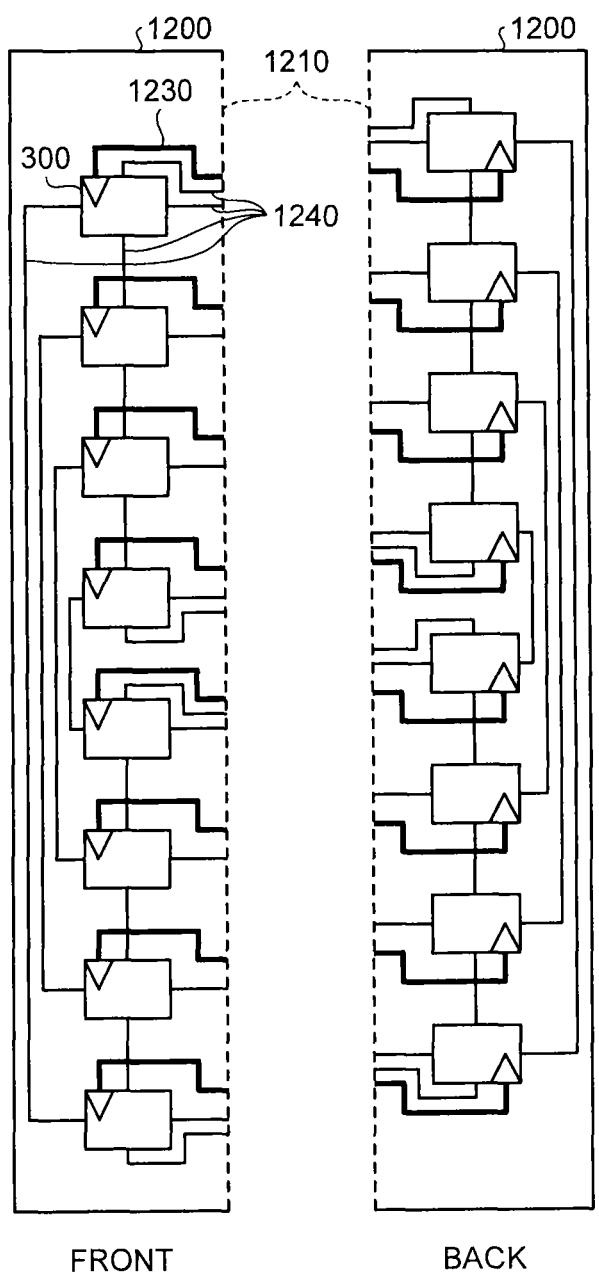
FIG. 14 is a diagram illustrating a mount state in which a memory node is mounted on a substrate according to the embodiment.

On this occasion, instead of connecting the wires 1240 to all the memory nodes 300 to the board slot connection unit 1210, the memory nodes 300 may be mutually wired on the memory node board 1200 as depicted in FIG. 14. This can reduce the wiring work for expanding the storage scale.

Figure 15:
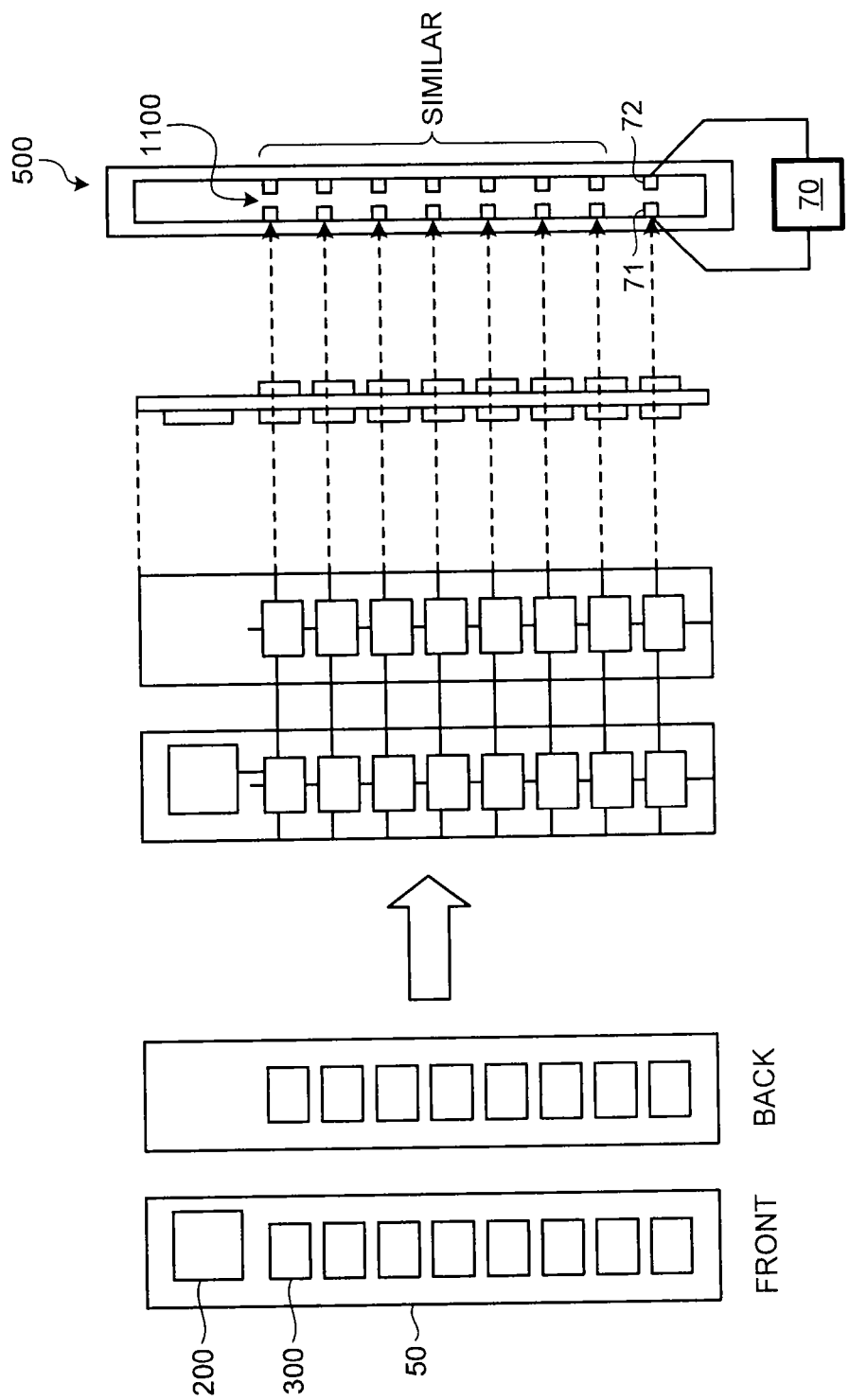
FIG. 15 is a diagram illustrating a mount state in which a printed board is mounted on a case according to the embodiment.

In any case of FIG. 13 and FIG. 14, a unit board 50 of 2 columns×8 rows is formed as illustrated in FIG. 15; here, such a structure is considered as that the unit board 50 is inserted to the connector 1100 as a slot of the case as depicted in the right part of the drawing. On this occasion, if the unit board 50 is removed in the maintenance or does not function because of a trouble, the routing interface of the adjacent unit board loses its connection counterpart and the packet transfer to that direction becomes impossible. In view of this, an analog switch 70 for allowing each of terminals 71 and 72 in the opposite slot to be connected to the slot having no more routing function due to, for example, the removal of the unit board 50 is mounted, whereby the deterioration in performance due to the trouble in route can be suppressed.

Figure 16:
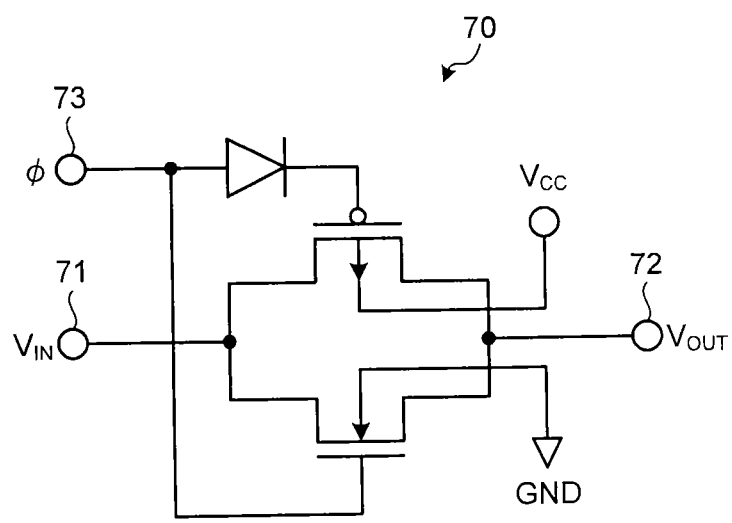
FIG. 16 is a diagram illustrating an example of an analog switch according to the embodiment.

FIG. 16 is a circuit diagram of a transmission gate as an example of the analog switch 70. As depicted in FIG. 15 and FIG. 16, the analog switch 70 includes at least one field effect transistor, and includes an input terminal 71, an output terminal 72, and a control terminal 73. The analog switch 70 is a circuit for outputting an electric signal of the input terminal 71 to the output terminal 72 by switching the ON/OFF of the electric signal to the control terminal 73. The transmission gate includes field effect transistors with different channels, and can achieve bi-directional operation independently of the polarity of the control circuit.

In other words, if a determination circuit of the board on the case side has determined that there is no more routing function of the slot, the ON electric signal is input to the control terminal 73 of the analog switch 70; thus, the packet transfer can be achieved via the analog switch 70. Thus, a normally-ON switch that operates when the memory node does not function can be achieved. Although the transmission gate is described as one example of the circuit, the present invention is not limited to this example. Although the determination circuit for determining the normal operation of the routing function is on the board on the case side in this example, the present invention is not limited thereto.

Figure 17:
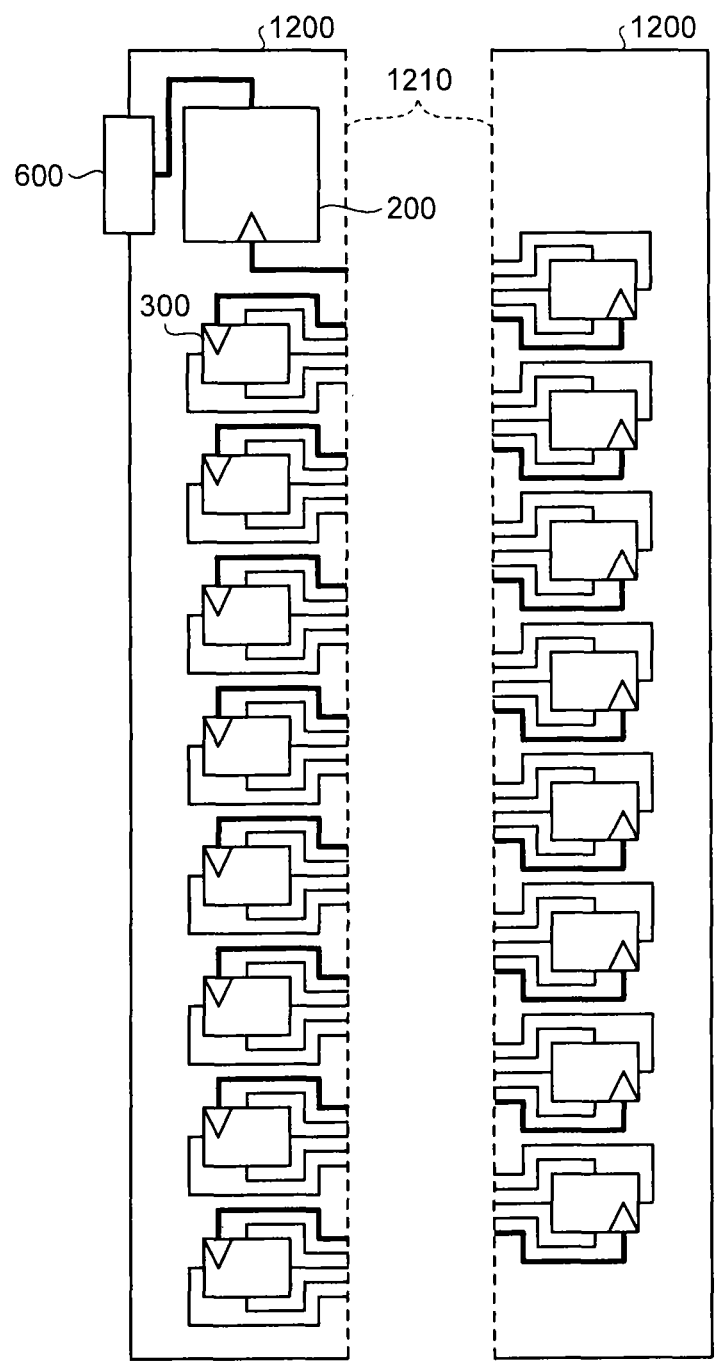
FIG. 17 is a diagram illustrating a state in which a processing unit and a memory node are mounted on the same substrate according to the embodiment.
Figure 18:
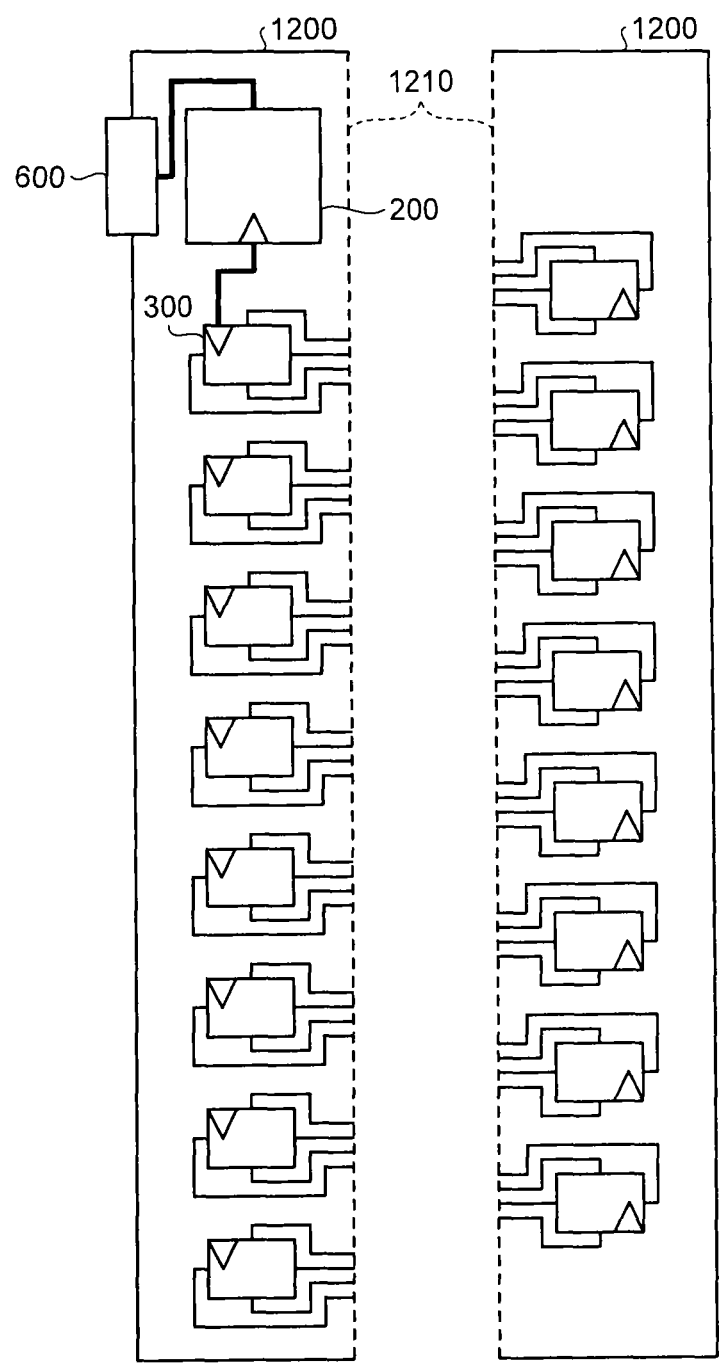
FIG. 18 is a diagram illustrating a state in which a processing unit and a memory node are mounted on the same substrate according to the embodiment.

FIG. 17 and FIG. 18 each depict one example in which the processing unit 200 and the memory node 300 are wired on a common printed board. FIG. 17 depicts the structure in which the processing unit 200 and the memory node 300 are connected on the board slot connection unit 1210 side. On the other hand, FIG. 18 depicts the structure in which the processing unit 200 and the memory node 300 are wired on the same printed board (hereinafter referred to as unit board). In this case, the wire length between the processing unit 200 and the memory node 300 can be shortened, thereby reducing the signal delay time.

Moreover, the wire of the storage interface can be reduced. Note that the first interface device 600 is designed on the unit board; however, the first interface device 600 may be connected to the board slot connection unit 1210 with a wire. Alternatively, the memory nodes 300 may be wired on the unit board.

Although the eight memory nodes are disposed in line on each surface of the unit board and just one processing unit 200 is disposed on a top surface in these drawings, the present invention is not limited thereto.

The provision of the processing unit and the memory nodes on the same board makes it possible to reduce the work of wiring between the memory nodes 300 and wiring between the processing unit 200 and the memory node 300 in the expansion of the scale of the storage device 10. Moreover, by combining the printed boards, the processing unit 200 can be connected inside the lattice of the memory nodes 300. Therefore, the number of average reach steps to the memory node 300 as a target can be reduced, thereby improving the storage performance.

Figure 19:
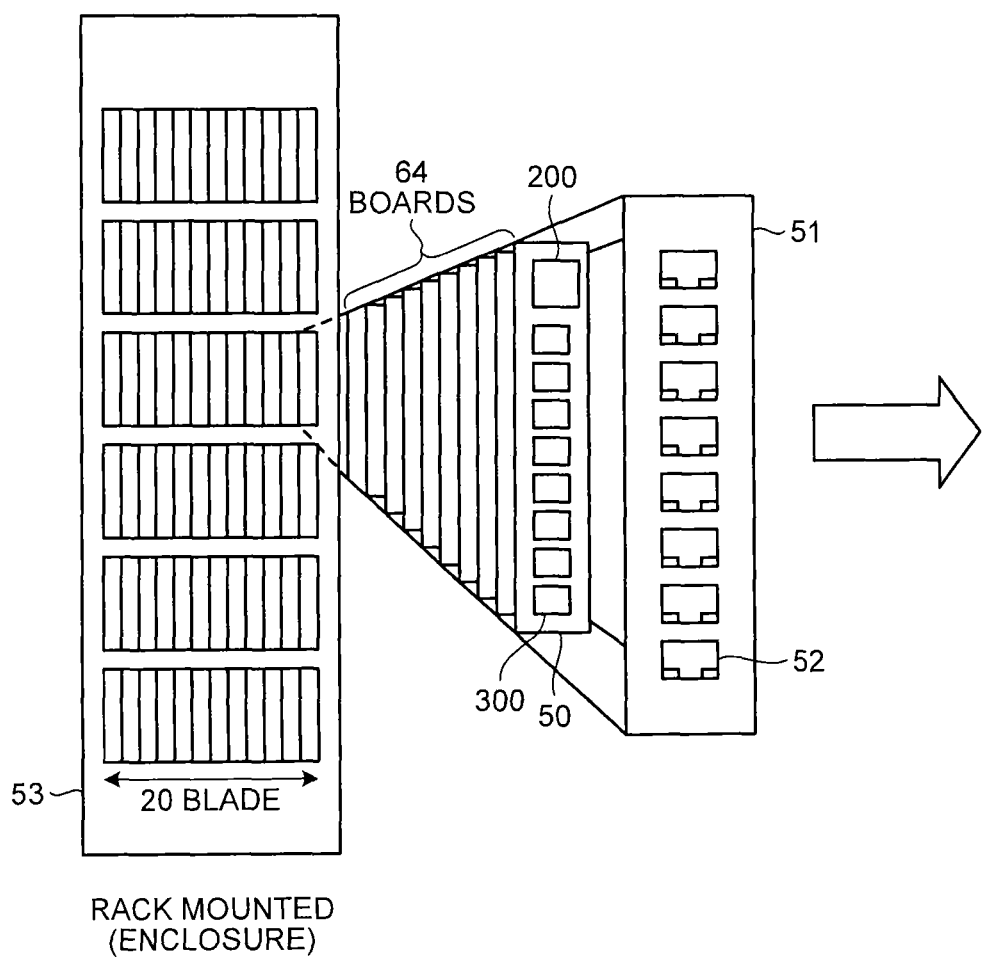
FIG. 19 is a diagram illustrating a state in which a printed board is mounted on a case according to the embodiment.

FIG. 19 depicts a specific example of a unit blade 51 for mounting the storage device 10. The unit blade 51 includes a plurality of unit boards 50, and includes a plurality of slots for allowing the insertion of the unit boards 50, and a plurality of network ports 52 for connecting to the network. The network ports 52 are connected to the first interface device 600 of the processing unit 200.

By the use of the unit blade 51, the different unit boards 50 can be connected to each other and all the memory nodes 300 disposed on the unit boards 50 can be connected to each other. By connecting the unit blades 51 to each other to mutually connect the memory nodes 300, the plural unit blades 51 can be structured to be a server rack 53 as a system to allow the easy expansion of the scale. In such a structure, only a part of the system in the server rack 53 may be structured as the storage device 10 of this embodiment. For example, just a certain one stage may be structured as the storage device 10 and the other blade servers may be structured as general servers or storage servers. In these cases, the storage device 10 needs to be connected to another host system. Moreover, in the case of the structure of the plural blade servers, it is not always necessary that all are used as the single storage device.

Figure 20:
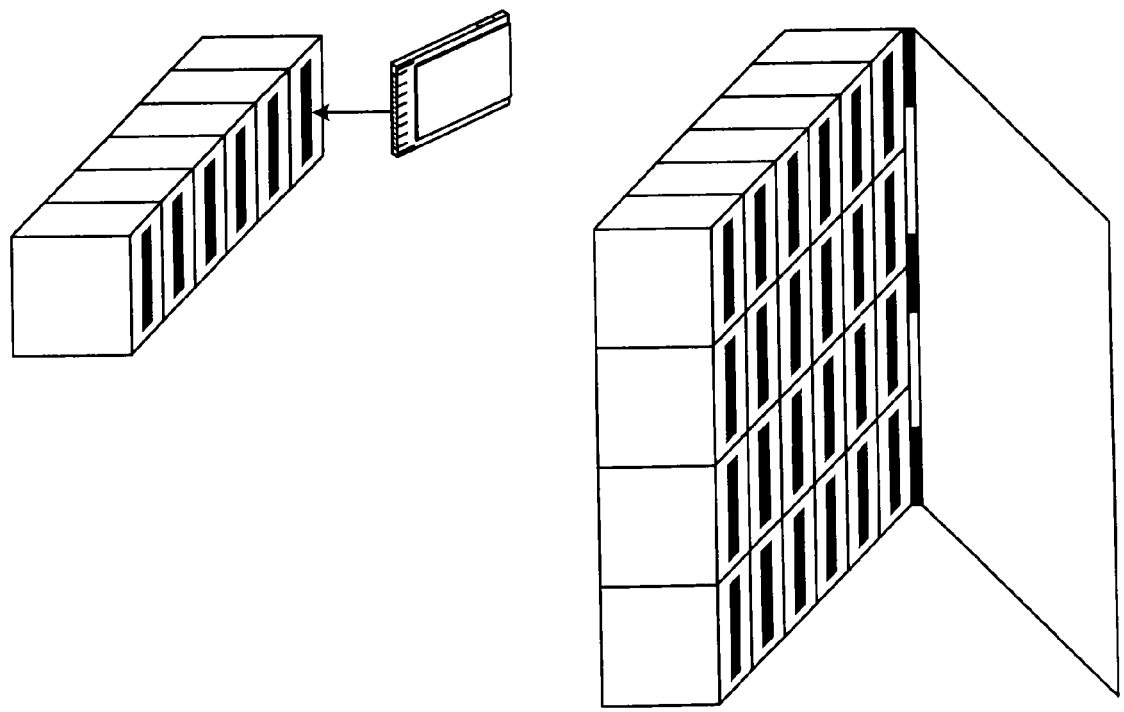
FIG. 20 is a diagram illustrating a state in which a printed board is mounted on a case according to the embodiment.

Since just the mutual connection between the memory nodes is necessary, the rack mount is not always necessary. For example, FIG. 20 depicts as an example, a method in which a PC card is inserted to a board having insertion ports such as PC slots arranged. This method can achieve a small and compact case with small depth. Further, since these are packaged, they are easily handled. Although the PC card is depicted in the drawing, the present invention is not limited thereto.

Figure 21:
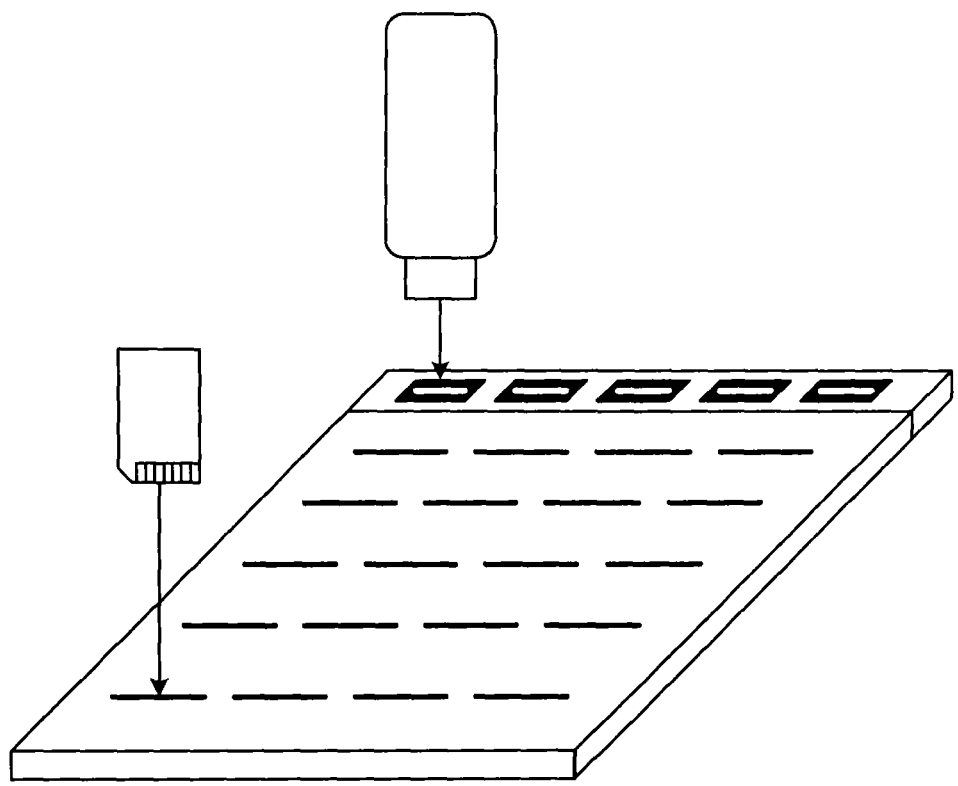
FIG. 21 is a diagram illustrating a state in which a printed board is mounted on a case according to the embodiment.

Alternatively, controllers may be paved in a lattice form in a board in advance, and nonvolatile memory may be added to the board later as depicted in FIG. 21. In this case, a controller to which nonvolatile memory is not connected can route. By arranging the controller and the processing unit, the scale out characteristic can be improved and flexible scale expansion such as appropriate increase in memory capacity can be achieved. Here, it is desirable that there is a slot to which an SD card or a USB memory can be added. This can achieve the storage device which can be easily structured by an individual.

In the storage device 10 according to this embodiment described above, the amount of data to be stored can be increased and the processing capability can be improved by increasing the unit board 50 provided with the processing unit 200 and the memory nodes 300. In other words, by increasing the number of processing units 200, the process can be performed without delay to the process request from the client PC connected to the external network. Thus, an advantage of this embodiment lies in that just by increasing the unit board 50, the performance of the storage device 10 can be easily improved without the necessity of improving the communication speed of the network and the performance of the processor.

The hot swap function of the storage device 10 is hereinafter described. In the occurrence of a trouble or at the maintenance of the server, a part with the trouble or a part to be maintained is replaced for the normal system operation. In particular, in a cloud system that is required to operate continuously such as a smart meter, the hot swap function that allows the part to be replaced without completely stopping the power source is essential.

The simplest structure of the storage device 10 according to the embodiment is that the unit board 50 or the unit blade 51 is capable of hot swap. In this structure, since the minimum replacement unit is the unit board 50, it is necessary that, even when one memory node 300 is in trouble, the other memory nodes 300 and the processing unit 200 are replaced. In view of this, if the processing unit 200 and the memory nodes 300 are capable of hot swap from the unit board 50, only the memory node 300 or the processing unit 200 in trouble can be replaced, thereby reducing the maintenance cost.

It is considered that a trouble occurs more frequently in nonvolatile memory with a lifetime such as NAND flash than in an LSI generally used in the controller 800 (see FIG. 7). In other words, when the nonvolatile memory is in trouble, the replacement in the unit of the memory node 300 requires the replacement of the controller that is not in trouble. In view of this, by allowing the hot swap of the nonvolatile memory from the memory node 300, just the nonvolatile memory in trouble can be replaced, thereby reducing the maintenance cost.

Although FIG. 1 depicts the memory nodes disposed in rectangular lattice form, the arrangement of the memory nodes is not limited thereto. The lattice form may be, for example, triangular or hexagonal as long as the memory node disposed in the lattice point is connected to the two or more memory nodes adjacent in different directions.

Although the memory nodes are arranged two-dimensionally in FIG. 1, the memory nodes may be disposed three-dimensionally by increasing the number of input/output ports of the controller by two. In the three-dimensional arrangement of the memory nodes, the position of the memory node can be specified by three values of (x, y, z). In the case of forming a torus from the two-dimensional square lattice, the torus can be achieved by connecting the nodes disposed at the opposite sides. For example, in the example of FIG. 10A, the memory node 300, the memory node 320, the memory node 300, the memory node 304, and the like are connected in the torus form. By employing the torus form, the average access distance from the processing unit to the memory node can be shortened, thereby improving the performance.

The number of processing units 200 connectable to the storage device 10 is considered. The number of memory nodes 300 is N and the number of processing units 200 is M. The condition for sending the packet while avoiding the congestion inside is "the packet is not sent before the packet sent by the processing unit 200 returns". The waiting time for this packet response is t [sec]. The throughput performance of the entire system is represented by M/t [IOPS].

Since the number of processing units 200 can be N, which is the number of memory nodes 300, at maximum, the number M is less than or equal to N. The response waiting time t is $t = 2\sqrt{N} \times t_s + t_f$, where $\sqrt{N}$ is the number of average steps on one way (i.e., $2\sqrt{N}$ for go and return), $t_s$ is the time taken to one routing, and $t_f$ is the time other than the routing (the time of reading and writing relative to the memory such as NAND flash).

On this occasion, the processing unit 200 may send the packet once in the time t; therefore, if the packet processing takes time $t_c$, the number M of the processing units 200 may be $(t_s + t_c)/t = (1 + t_c/t_s)/(2\sqrt{N} + t_f/t_s)$ in proportion relative to the number N of the memory nodes 300. That is, $M \leq N \times (1 + t_c/t_s)/(2\sqrt{N} + t_f/t_s)$. Accordingly, the number M of the processing units 200 is optimal in the range of $N \times (1 + t_c/t_s)/(2\sqrt{N} + t_f/t_s)$ or more and N or less.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a plurality of processing units configured to issue a control instruction for reading out or writing data; and
   a plurality of storage units connected to each other in two- or more- dimensional arrangement, wherein
   each storage unit includes a memory capable of storing data and a routing unit configured to perform a transfer process by determining a transfer route of the data to another one of the storage units on the basis of positional information of the storage unit included in the data, and
   $N \times (1 + t_c/t_s)/(2\sqrt{N} + t_f/t_s) \leq M \leq N$ is satisfied wherein N is the number of the storage units, M is the number of the processing units, $t_c$ is a processing time taken by each processing unit to read out and write, $t_s$ is one transfer time between the storage units, and $t_f$ is a time taken to perform other processes in the storage unit.

2. The device according to claim 1, further comprising a plurality of printed boards connected to each other, wherein at least one processing unit and at least one of the storage units are disposed on each of the printed boards.

3. The device according to claim 2, further comprising a plurality of slots to which the printed boards are inserted, respectively, wherein
   each of the slots includes a switch unit configured to switch so that terminals facing each other of the each of the slots are connected to each other when the printed board is not inserted to the each of the slots.

4. The device according to claim 2, wherein the processing units and the storage units are capable of hot swap.

5. The device according to claim 2, wherein the memory is configured to be hot-swapped from the storage unit in which said memory is included.

* * * * *